(12) United States Patent
Jany-Luig et al.

(10) Patent No.: US 12,187,304 B2
(45) Date of Patent: Jan. 7, 2025

(54) METHOD AND DEVICE FOR CONTROLLING PEDALS OF A VEHICLE

(71) Applicant: AVL List GmbH, Graz (AT)

(72) Inventors: Johannes Jany-Luig, Graz (AT); Hans Peter Gigerl, Gutenberg-Stenzengreith (AT); Wolfgang Winkler, Pischelsdorf in der Steiermark (AT); David Lemmerer, Weiz (AT)

(73) Assignee: AVL List GmbH, Graz (AT)

( * ) Notice: Subject to any disclaimer, the term of this patent is extended or adjusted under 35 U.S.C. 154(b) by 15 days.

(21) Appl. No.: 17/618,542

(22) PCT Filed: Jun. 10, 2020

(86) PCT No.: PCT/AT2020/060237
§ 371 (c)(1),
(2) Date: Dec. 13, 2021

(87) PCT Pub. No.: WO2020/247996
PCT Pub. Date: Dec. 17, 2020

(65) Prior Publication Data
US 2022/0355812 A1    Nov. 10, 2022

(30) Foreign Application Priority Data
Jun. 13, 2019    (AT) .............................. A 50533/2019

(51) Int. Cl.
*B60W 50/08* (2020.01)
*B60W 40/10* (2012.01)
*G01M 17/007* (2006.01)

(52) U.S. Cl.
CPC .......... *B60W 50/087* (2013.01); *B60W 40/10* (2013.01); *B60W 50/085* (2013.01);
(Continued)

(58) Field of Classification Search
CPC .. B60W 50/087; B60W 40/10; B60W 50/085; B60W 2520/00; B60W 2540/10;
(Continued)

(56) References Cited

U.S. PATENT DOCUMENTS 5,430,645 A    7/1995 Keller
6,442,472 B1 *    8/2002 Vivek ................... F02D 31/002
                                                    701/110

(Continued)

FOREIGN PATENT DOCUMENTS

DE    4103579    10/1991
DE    4240756    6/1993
(Continued)

OTHER PUBLICATIONS

Merriam-Webster, "Range" (Year: 2005).*
(Continued)

*Primary Examiner* — Aniss Chad
*Assistant Examiner* — Stephanie T Su

(57) ABSTRACT

The present invention relates to a method for operating a driver model for controlling a vehicle. The driver model comprises a vehicle module (203) which determines an accelerator pedal position to be set on the vehicle. In addition, the vehicle module (203) determines a required power as a component of a total power, which total power can be generated by a drive system of the vehicle, wherein the required power corresponds to a power that is necessary for moving the vehicle at a required speed and/or a required acceleration (311) along a predefined road course. The method according to the invention further provides for a value (313) of a permissible pedal position to be assigned to the required power and for the value (313) of the permissible pedal position to be transmitted to the driver model in order to control the vehicle.

13 Claims, 3 Drawing Sheets

(52) U.S. Cl.
CPC ..... *B60W 2520/00* (2013.01); *B60W 2540/10* (2013.01); *G01M 17/007* (2013.01)

(58) Field of Classification Search
CPC ......... B60W 2556/50; B60W 2720/10; B60W 2720/106; B60W 30/188; B60W 2050/0011; B60W 2050/0029; B60W 10/04; B60W 10/18; G01M 17/007; G01M 17/06; G01M 17/0072; B60R 16/0231; B60K 26/02
See application file for complete search history.

(56) References Cited

U.S. PATENT DOCUMENTS

| | | | | |
|---|---|---|---|---|
| 9,789,873 | B2 * | 10/2017 | Crombez | F02D 41/2422 |
| 10,926,779 | B1 * | 2/2021 | Sullivan | B60W 10/04 |
| 2005/0096183 | A1 | 5/2005 | Watanabe et al. | |
| 2011/0307155 | A1 * | 12/2011 | Simard | F02D 11/105 |
| | | | | 701/93 |
| 2013/0225367 | A1 * | 8/2013 | Dietzel | B60W 20/19 |
| | | | | 477/97 |
| 2013/0297185 | A1 * | 11/2013 | Morris | F02D 11/105 |
| | | | | 701/104 |
| 2015/0127236 | A1 * | 5/2015 | Sieber | B60W 50/16 |
| | | | | 701/70 |
| 2016/0019792 | A1 * | 1/2016 | Kawamata | G07C 5/085 |
| | | | | 701/70 |
| 2017/0369077 | A1 * | 12/2017 | Hirano | B60W 60/0055 |
| 2018/0111616 | A1 * | 4/2018 | Herb | B60W 10/184 |

FOREIGN PATENT DOCUMENTS

| | | |
|---|---|---|
| DE | 102014012319 | 2/2016 |
| JP | 03-233339 | 10/1991 |
| JP | 2004-142690 | 5/2004 |
| WO | WO 2019/110480 | 6/2019 |

OTHER PUBLICATIONS

Merriam-Webster, "Test" (Year: 2006).*
Beschluss zur Erteilung eines Patentes [Decision to Grant A Patent] Dated May 18, 2020 From the Österreichisches Patentamt, Abteilung Erfindungen [Austrian Patent Office, Department of Invention] Re. Application No. A 50533/2019. (2 Pages).
International Search Report and the Written Opinion Dated Oct. 7, 2020 From the International Searching Authority Re. Application No. PCT/AT2020/060237 and Its Translation of Search Report Into English. (12 Pages).
Notice of Reasons for Refusal Dated Apr. 2, 2024 From the Japan Patent Office Re. Application No. 2021-573773 and Its Translation Into English. (7 Pages).

* cited by examiner

METHOD AND DEVICE FOR CONTROLLING PEDALS OF A VEHICLE

RELATED APPLICATIONS

This application is a National Phase of PCT Patent Application No. PCT/AT2020/060237 having International filing date of Jun. 10, 2020, which claims the benefit of priority of Austrian Patent Application No. A 50533/2019 filed on Jun. 13, 2019. The contents of the above applications are all incorporated by reference as if fully set forth herein in their entirety.

The present invention relates to a method for operating a driver model for controlling a vehicle, a control device, the use of the control device to carry out of a test run for a vehicle and a computer program product.

Known in the prior art are driver models, for example algorithms for controlling a vehicle, which, by means of a PI controller, determine a pedal value for adjusting for example an accelerator pedal of a vehicle solely depending on a difference between a current vehicle speed and a specified vehicle speed.

A driver model operated as described above leads to abrupt adjustment procedures of a vehicle with sharp acceleration and a corresponding unnecessarily high fuel consumption or pollutant emissions.

It is the object of the present invention to address, at least in part, the problems described above. In particular, it is an object of the present invention to provide a driver model which operates a vehicle in a more fuel-efficient manner and with lower emissions.

The above object is achieved through the claims. In particular, the above object is achieved through the subject matter of the respective independent claims. Further advantages of the invention arise from the dependent claims, the description and the drawings. Naturally, features and details which are described in connection with the present method also apply in connection with the control device according to the invention and vice versa, so that with regard to the disclosure, mutual reference is or can always be made to the individual aspects of the invention.

According to a first aspect of the present invention, a method for operating a driver model for controlling a vehicle is presented. The driver model thereby comprises a vehicle module which determines a pedal position to be set on the vehicle. The vehicle module also determines a required power as a component of a total power which can be generated by a drive system of the vehicle, wherein the required power corresponds to a power that is necessary for moving the vehicle at a required speed and/or a required acceleration along a predefined road course. Furthermore, according to the present method the required power is assigned a value of a permissible pedal position, and the value of the permissible pedal position, in particular an accelerator pedal position, is transmitted to the driver model in order to control the vehicle.

Within the context of the present disclosure, a driver model is to be understood to mean an algorithm which is used to control a vehicle. In particular, a driver model can be used to control driving functions, for example to adjust respective pedals of a vehicle.

The present method serves in particular to limit a power generated by a vehicle in order to avoid unnecessary bursts of acceleration such as are typical with operation of a vehicle by a driver model, for example during a gear change. For this purpose, the present method provides for the determination of a required power specified for a predefined road course. In particular, the predefined road course can thereby be a road course registered by means of at least one sensor of the vehicle and/or a road course determined by means of a digital map for a respective route which is to be driven. For example, a predefined road course can be a section of a road for which a vehicle speed which is to be maintained is specified according to a specified test protocol.

The required power according to the invention is determined or stated as a component of a total power which can potentially be generated by a vehicle, for example in "%".

The required power according to the invention is demanded from a drive of a respective vehicle in order to achieve an acceleration specified for a predefined road course and a vehicle speed specified for a road course. For this purpose, the driver model according to the invention adjusts the vehicle in such a way that the vehicle provides the required power. For this purpose, a required power is assigned a value of a permissible pedal position, for example by a computing unit using an assignment table or an assignment function, and the value of the permissible pedal position is transmitted to the driver model according to the invention.

As soon as the value of the permissible pedal position is transmitted to the driver model by the vehicle module or the value of the permissible pedal position is determined by means of the vehicle module, the driver model can adjust respective pedals of controlled vehicle according to the value of the permissible pedal position. For this purpose, the value of the permissible pedal position can for example be transmitted to a pedal control unit, so that the pedal control unit moves a respective pedal, in particular an accelerator pedal of the vehicle, at most up to a position which corresponds to or substantially corresponds to the value of the permissible pedal position. The position of the pedal substantially corresponds to the value of the permissible pedal position if the pedal is in a position which corresponds to the value of the permissible pedal position plus or minus a specified tolerance of for example 5%, preferably 2%, particularly preferably 0.5%.

The value of the permissible pedal position according to the invention serves in particular as a limit value beyond which or below which a pedal position to be set by a driver model should or may not be changed.

Accordingly, the value of the permissible pedal position according to the invention acts as a control instance superimposed on control means used by a driver model to control a vehicle, for example a PI controller, so that in the event that the driver model specifies an actuating value which leads to a pedal position which lies above or below the value of the permissible pedal position, the actuating value is automatically replaced by the value of the permissible pedal position or the actuating value is automatically adapted accordingly to the value of the permissible pedal position.

In other words, through the present method the power generated by a vehicle is limited or throttled in order to achieve a vehicle speed and acceleration required for a respective road course or section of road.

Using the present method, in one embodiment a PID controller for controlling a pedal control unit can be dispensed with and instead a corresponding vehicle or a corresponding pedal control unit can be controlled directly by means of the values for a permissible pedal position determined according to the invention. Alternatively, it can be the case that a PID controller is used to smooth a plurality of values for a permissible pedal position determined according to the invention.

It can be the case that the driver model comprises a control module by means of which an actuating value for adjusting a respective pedal is determined, wherein the actuating value is limited, in particular dynamically, by an upper limit value which is determined on the basis of the value of the permissible pedal position.

In order to use the value of the permissible pedal position according to the invention to control a vehicle, the value of the permissible pedal position can be transmitted to a control module which converts the value of the permissible pedal position into a limit value on which a control procedure for adjusting a pedal is based.

The control module can for example be a PI controller or a PID controller designed to determine an actuating value of a pedal of a vehicle.

It can be the case that the required power according to the invention provided in that a brake pedal of the vehicle is adjusted according to a value for a permissible brake pedal position.

It can also be the case that the upper limit value for the actuating value of a respective pedal is determined by means of the control module in that, in the event that a power requirement which is to be generated by the drive system of the vehicle increases, the upper limit value of the power requirement is increased accordingly, and in the event that the current power requirement is less than a weighted characteristic value which corresponds to the value of a power requirement immediately preceding the current power requirement, weighted with a weighting factor, the weighted value is selected as upper limit value.

Through an upper limit value which is adapted depending on a current power requirement which is to be generated by a drive of a vehicle, a dynamic, i.e. continuously adapted limitation of a power output of the vehicle can take place, so that an operating status in which the vehicle is operated with poor fuel efficiency or with increased or suboptimal pollutant emission levels is avoided, even during an acceleration procedure.

It can also be the case that the weighting factor corresponds to a value of less than one.

In particular, the weighting factor can correspond to a value of "0.999".

It can be the case that a transmitted value which is transmitted to a control module to determine the upper limit value corresponds to a value of the permissible pedal position multiplied by a factor, for example the factor "1.5".

Using a factorised value of the permissible pedal position as transmitted value for determination of an upper limit value by a control module means that the upper limit value can be formed with a tolerance addition, so that the vehicle can also be operated in an operating status which, within a tolerance band specified through a corresponding factor, releases more power than provided for per se by the value of the permissible pedal position.

It can also be the case that the actuating value is limited by a lower limit value, wherein the lower limit value is determined on the basis of the value of the permissible pedal position or the lower limit value is specified.

A minimum power with which a vehicle is operated at a specified power requirement can be specified by means of a lower limit value. For this purpose, the lower limit value can be determined on the basis of the value of the permissible pedal position, so that a tolerance band is defined by an upper limit value and a lower limit value which varies depending on the value of the permissible pedal position.

It can also be the case that the driver model includes a target acceleration determination module by means of which an acceleration power to be provided by the vehicle is determined in that a difference in speed between a speed required for at least one future time and a speed required for a current time is determined and an acceleration power required in order to equalise the difference in speed is determined on the basis of the determined difference in speed. It is also the case that the target acceleration determination module transmits the determined required acceleration power to the driver model as required acceleration power.

A prediction period can be formed through a difference in speed between a speed required for at least one future time and a speed required for a current time for which a required acceleration power can be calculated on the basis of the difference in speed. With a prediction period of a known or specified duration, a difference in speed to be expected at a known time, namely an end of the prediction period, with a constant vehicle behaviour can be transformed into an acceleration power which is required in order to overcome the difference in speed within the prediction period. A prediction period can thereby have a duration of for example between 0.001 seconds and 5 seconds, in particular between 0.001 seconds and 2 seconds.

It can also be the case that a required acceleration power is determined on the basis of a plurality of differences in speed for a plurality of speeds required in the future. It can for example be the case that a difference in speed and a corresponding acceleration power is determined for each second within a prediction period. It can thereby be the case that a future required speed is determined with a specified working cycle of for example 100 milliseconds or 1000 milliseconds duration. Accordingly, a corresponding acceleration power can be determined for each working cycle.

On the basis of the determined acceleration power, a required power can be determined which is to be set on a vehicle in order to accelerate the vehicle with the determined acceleration power, so that the vehicle reaches the specified speed or minimises the difference in speed accordingly within the prediction period. For this purpose, a respective acceleration power can be assigned a required power or a corresponding value of a permissible pedal position, for example by means of an assignment table or an assignment function.

According to a second aspect, the present invention relates to a control device for operating a driver model for controlling a vehicle. The control device includes a driver module which is configured to operate the driver model. The driver module includes a vehicle module which is configured to determine a pedal position to be set on the vehicle. The driver module includes a requirement determining module which is configured to determine a required power as a component of a total power which can be generated by a drive system of the vehicle, wherein the required power corresponds to a power that is necessary for moving the vehicle at a required speed and/or a required acceleration along a predefined road course. The driver module also includes an assignment module which is configured to assign the required power a value of a permissible pedal position, and a transmitter module which is configured to transmit the value of the permissible pedal position to the driver model to control the vehicle.

Thus, a method according to the invention brings the same advantages as have been described in detail with regard to the device according to the invention.

It can be the case that the driver module includes a control module which is configured to determine an actuating value for adjusting a respective pedal, wherein the control module is configured to limit the actuating value dynamically through an upper limit value, and to determine the upper limit value on the basis of the value of the permissible pedal position.

It can also be the case that the driver module includes a target acceleration determination module which is configured to determine an acceleration power to be provided by the vehicle in that a difference in speed between a speed required for at least one future time and a speed required for a current time is determined and an acceleration power required in order to equalise the difference in speed is determined on the basis of the determined difference in speed, wherein the driver module is configured to transmit the determined required acceleration power to the driver model as required acceleration power.

The target acceleration determination module can for example determine a required target acceleration power using formula (1).

$$a_{dem} = v_{dem}(t+\Delta t) - v_{act}(t) \tag{1}$$

"$a_{dem}$" corresponds here to a required target acceleration power, "$v_{dem}$" a required target speed, "$v_{act}$" a current speed and "t" the time in [seconds].

According to a third aspect, the present invention relates to the use of the present control device to carry out a test run for a vehicle.

In order to carry out a test run, for example a test run to record vehicle emissions in real operation, the present control device can control a vehicle being tested using respectively determined pedal positions or using respectively determined speed and/or acceleration values.

According to a fourth aspect, the present invention relates to a computer program product comprising program code means which configure a computer to carry out all steps according to at least one possible embodiment of the present method when run on the computer.

The computer program product can be implemented as computer-readable instruction code in any appropriate programming language such as JAVA or C++. The computer program product may be stored on a computer-readable storage medium such as a data disk, a removable drive, a volatile or non-volatile storage means, or in a built-in storage means/processor. The instruction code can program a computer or other programmable device such as the control device in such a way that the desired functions are carried out. Furthermore, the computer program product may be provided in a network such as the Internet, from which it can be downloaded by a user as required. The computer program product can be realised both by means of a computer program, i.e. as software, as well as by means of one or more special electronic circuits, i.e. as hardware, or in any hybrid form, i.e. by means of software components and hardware components.

Further measures to improve the invention are explained in the following description of various exemplary embodiments of the invention, which are represented schematically in the figures. All features and/or advantages resulting from the claims, the description or the figures, including constructive details and spatial arrangements, may be essential to the invention both in themselves and in the various combinations.

In each case schematically:

Figure 1:
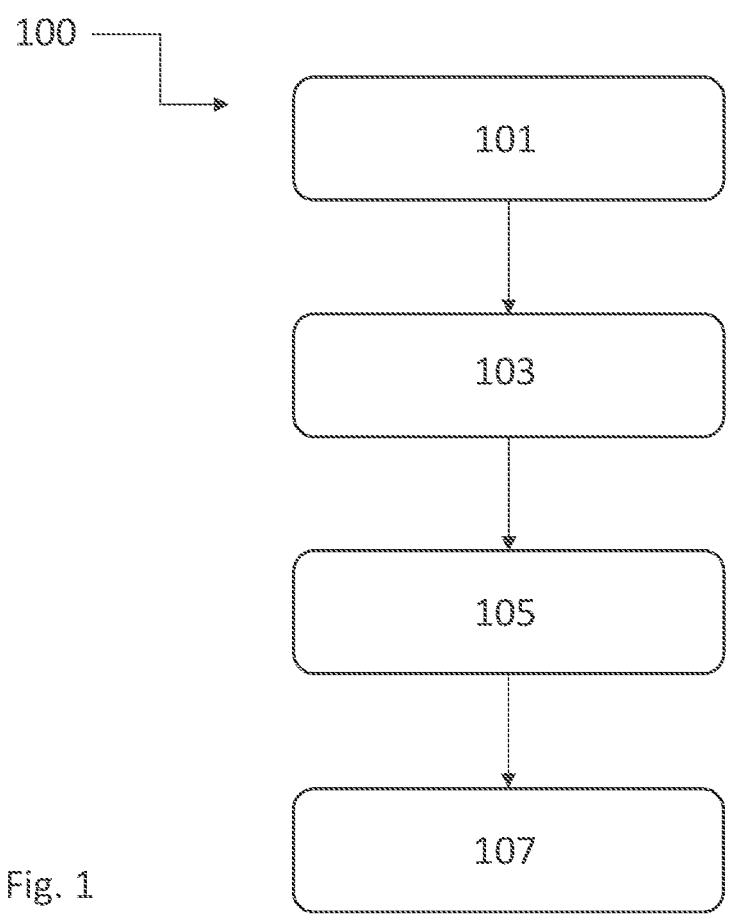
FIG. 1 shows a sequence diagram of a sequence of a possible embodiment of the method according to the invention.

A sequence 100 of a possible embodiment of the present method is represented schematically in FIG. 1.

In a first determining step 101, a pedal position which is to be set on a vehicle, in the present case, by way of example, an accelerator pedal position, is determined by means of a driver module of a driver model which is run on a computer.

In order to determine the accelerator pedal position which is to be set on the vehicle, in a second determining step 103 a required power is determined by the driver module as a component of a total power which can be generated by a drive system. The required power thereby corresponds to a power that is necessary for moving the vehicle at a required speed, i.e. a speed specified for a predefined road course, and a required acceleration along the predefined road course. The required acceleration power can thereby be determined for example on the basis of the required speed in that for example a difference in speed between a current speed of the vehicle and a speed required at a known time is determined. The required acceleration thereby corresponds to the acceleration which is required in order, starting out from the current speed, to attain at the known time the speed required at the known time.

In an assignment step 105, the determined required power is assigned a value of a permissible accelerator pedal position. The value of the permissible accelerator pedal position is thereby selected in such a way that the fuel consumption and/or pollutant emissions of the vehicle are minimised while providing the determined required power.

In a transmission step 107, the value of the permissible accelerator pedal position is transmitted to the driver model in order to control the vehicle. Accordingly, the driver model controls a pedal control device for example in such a way that a pedal of the vehicle is moved at most up to the value of the permissible accelerator pedal position. For this purpose, the driver model can for example generate a corresponding control command which configures the pedal control device to move the pedal according to a characteristic specified through the control command or which specifies a corresponding limit value for the pedal control device which limits a movement of the pedal according to the value of the permissible accelerator pedal position.

The driver module uses a vehicle model to determine a relative required power using formulas (2) and (3).

$$P_{dem} = F_{total} \cdot v_{dem}, \tag{2}$$

$$P_{rel} = \frac{P_{dem}}{P_{max}} \cdot 100\%. \tag{3}$$

where: "$v_{dem}$" is a current target speed in metres per second and $F_{total} = F_{Luft} + F_{inc} + F_{prop}$, where $F_{Luft} = A_0 + B_0 \cdot v_{dem} + C_0 \cdot v_{dem}^2$, $F_{Inc} = m \cdot g \cdot v_{dem} \cdot \sin \alpha$, and $F_{Prop} = m \cdot a_{dem}$, "$P_{rel}$" corresponds to a in a, and $F_{prop}$ required power, $P_{dem}$ a demanded power, $P_{max}$ a maximum power of a respective vehicle, $v_{dem}$ a demanded speed. The parameters m, $P_{max}$, $A_0$, $B_0$ and $C_0$ are variables of the function, the acceleration due to gravity g corresponds to 9.81 m/s² squared and the angle of inclination is determined by $$\alpha = \tan-1 \frac{rg}{100}.$$

Figure 2:
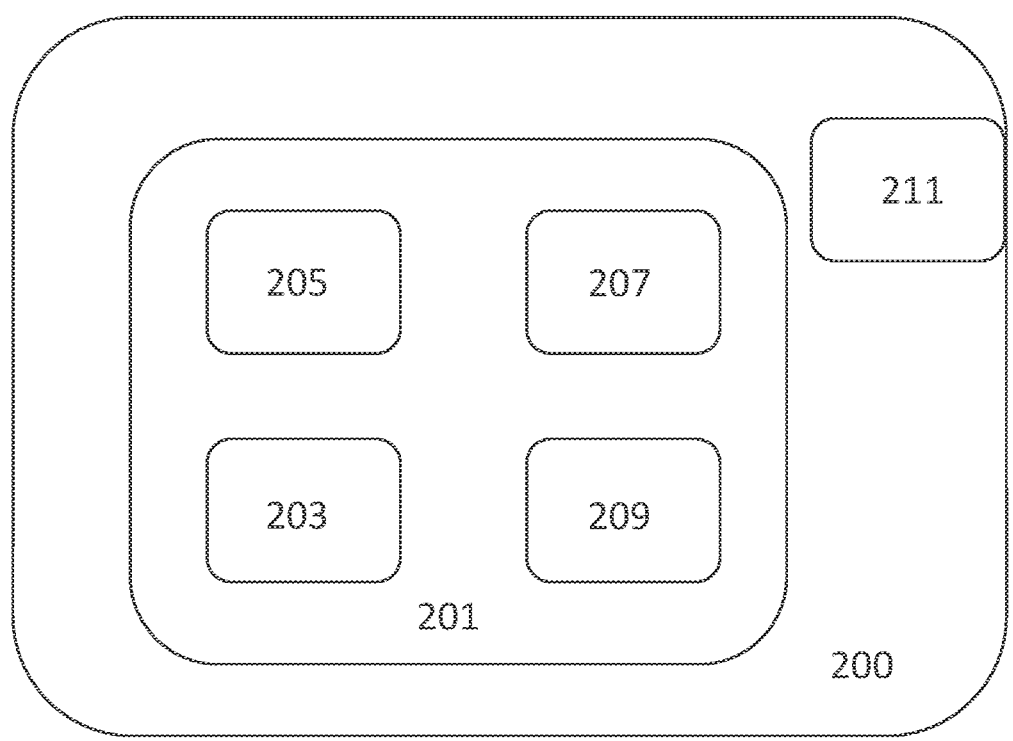
FIG. 2 shows a representation of a possible embodiment of the control device according to the invention.

A control device 200 is represented in FIG. 2. The control device 200 comprises a driver module 201 which is configured to operate a driver model.

The driver module 201 includes a vehicle module 203 which is configured to determine an accelerator pedal position to be set on the vehicle.

The driver module 201 further includes a requirement determining module 205 which is configured to determine a required power as a component of a total power which can be generated by a drive system of the vehicle, wherein the required power corresponds to a power that is necessary for moving the vehicle at a required speed and/or a required acceleration along a predefined road course.

The driver module 201 further includes an assignment module 207 which is configured to assign the required power a value of a permissible accelerator pedal position.

The driver module 201 further includes a transmitter module 209 which is configured to transfer the value of the permissible pedal position to the driver model in order to control the vehicle.

By means of an interface 211, which can for example be designed as a wireless interface or a wired interface, the control device 200 is in communicative connection with a vehicle or an actuator system, for example a pedal actuator, in order to control a vehicle.

Figure 3:
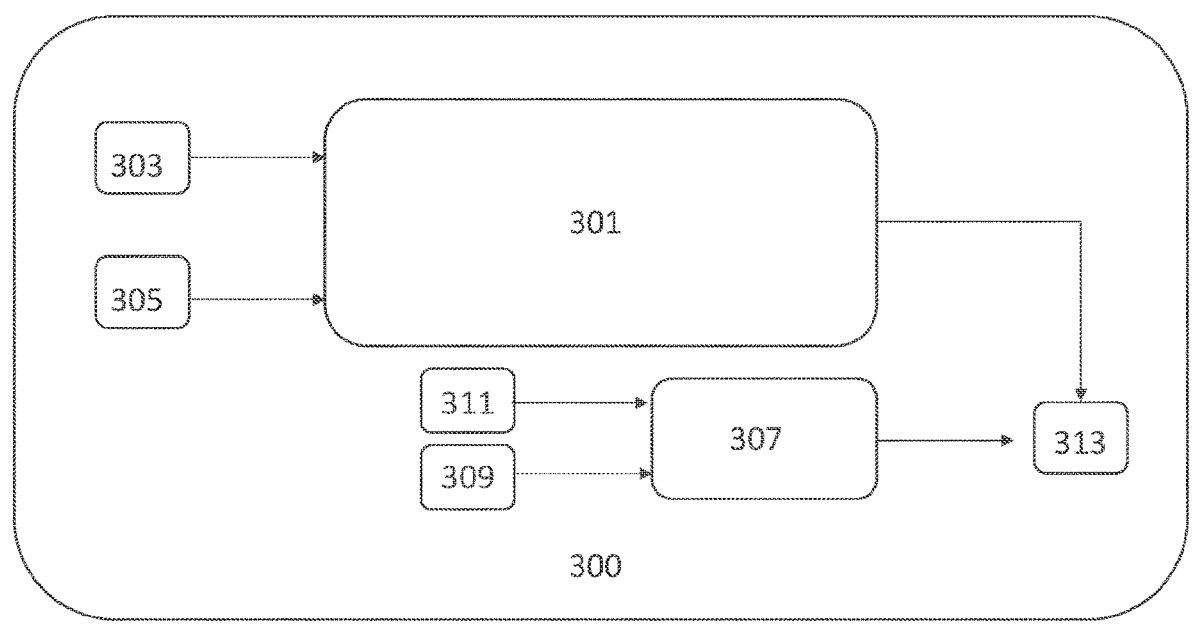
FIG. 3 shows a visualisation of a possible embodiment of a control module.

A control module 300 is represented in FIG. 3. The control module 300 includes a determining unit 301 for adaptive or dynamic determination of an upper limit value and a lower limit value of a permissible accelerator pedal position.

As input signal, the determining unit 301 receives a current value of an accelerator pedal position 303 from a pedal pre-control unit and a specified minimum value function 305, on the basis of which the lower limit value is determined directly. The specified minimum value function 305 can for example be a function of an assignment table for determining a minimum position of an accelerator pedal.

Furthermore, the determining unit 301 determines the upper limit value of the permissible accelerator pedal position on the basis of a required power which is required for a respective road course or section of road.

Furthermore, the control module 300 includes a PID controller 307 which determines a value 313 for adjusting the accelerator pedal of the vehicle on the basis of a current vehicle acceleration 309 and a required acceleration 311 which is required for the respective road course or section of road.

The determining unit 301 compares a value 313 for adjusting the accelerator pedal determined by the PID controller with the lower and the upper limit value. If the value determined by the PID controller 307 is greater than the upper limit value or less than the lower limit value, a corresponding movement of the accelerator pedal beyond the upper limit value or below the lower limit value is prevented in that for example the value determined by the PID controller 307 is replaced by the upper or the lower limit value.

Alternatively, it can be the case that the PID controller 307 is replaced by the determining module or that the PID controller 307 is installed after the determining module in order to smooth values determined by the determining module or equalise fluctuations in the values determined by the determining module.

The upper limit value and the lower limit value are continuously updated depending on the road course and a current vehicle speed and/or the current speed of the vehicle.

The value for adjusting the accelerator pedal can for example be determined by means of the following formulas (4), (5):

$$y(t)=u(t) \quad (4)$$

Formula (4) is valid for the following condition: $u(t) \geq 0.999y(t-1)$, otherwise formula (5) applies.

$$y(t)=0.999y(t-1) \quad (5)$$

where: "$y(t)$" corresponds to a value for adjusting an accelerator pedal, "$u(t)$" an input value, for example a value, factorised by means of a factor of in particular 1.5, for adjusting an accelerator pedal, which was determined in an actuating step immediately preceding a current time, "t" corresponds to the time in [seconds], "0.999" a weighting value.

In addition to the illustrated embodiments, the invention allows for further design principles. That is to say, the invention should not be considered to be limited to the exemplary embodiments explained with reference to the figures.

LIST OF REFERENCE SIGNS

100 sequence
101 first determining step
103 second determining step
105 assignment step
107 transmission step
200 control device
201 driver module
203 vehicle module
205 requirement determining module
207 assignment module
209 transmitter module
211 interface
300 control module
301 determining unit
303 value of an accelerator pedal position
305 minimum value function
307 PID controller
309 value of a current vehicle acceleration
311 required acceleration
313 value for adjusting the accelerator pedal

The invention claimed is:

1. A method for operating a driver model for controlling a vehicle in a test run, comprising:
   using one or more controllers for determining a required power as a component of a total power which can be generated by a drive system of the vehicle, wherein the required power corresponds to a power that is necessary for moving the vehicle at a at least one of a required speed and a required acceleration along a predefined road course, and
   assigning to the required power a value of a permissible pedal position,
   transmitting the value of the permissible pedal position to a pedal control unit, and
   controlling in the test run a position of a pedal of the vehicle by using the pedal control unit for moving the pedal according to an outcome of assigning the value of the permissible pedal position in the driver model executed by the one or more controllers;
   wherein the driver model specifies in the test run a plurality of actuating values for controlling the position of the pedal;

wherein the one or more controllers uses the driver model to determine an acceleration power to be provided by the vehicle based on a difference in speed between a speed required for at least one future time and a speed required for a current time specified according to a test protocol;

wherein the acceleration power is required in order to equalise the difference in speed in the test run and is determined on the basis of the determined difference in speed, and wherein the determined required acceleration power is transmitted to the driver model as required acceleration power.

2. The method according to claim 1, wherein when executed by the one or more controllers the driver model determines an actuating value of the plurality of actuating values for adjusting the pedal, wherein the actuating value is limited, in particular dynamically, by an upper limit value which is determined on the basis of the value of the permissible pedal position.

3. The method according to claim 2, wherein the upper limit value for the actuating value of the pedal is determined in the event that a power requirement which is to be provided by the drive system of the vehicle increases, the upper limit value for the power requirement is increased accordingly, and in the event that the current power requirement is less than a weighted characteristic value which corresponds to a value of a power requirement immediately preceding the current power requirement, weighted with a weighting factor, the weighted value is selected as the upper limit value.

4. The method according to claim 3, wherein the driver model receives a value to determine accordingly the upper limit value corresponds to a value of the permissible pedal position which was multiplied by a factor.

5. The method according to claim 3, wherein the weighting factor corresponds to a value of less than one.

6. The method according to claim 2, wherein the driver model is executed by a proportional integral derivative (PID) controller for adjusting the actuating value.

7. The method according to claim 2, wherein the actuating value is limited by a lower limit value, wherein the lower limit value is determined on the basis of the value of the permissible pedal position or the lower limit value is specified.

8. The method according to claim 1, wherein the predefined road course is a road course registered by means of at least one sensor of at least one of the vehicles and a road course determined by means of a digital map for a respective route which is to be driven.

9. A control device for operating a driver model for controlling a vehicle in a test run to record vehicle emissions, one or more controllers which are configured to operate the driver model to determine a position of a pedal to be set on the vehicle, wherein the one or more controllers execute a code for determining a required power as a component of a total power which can be generated by a drive system of the vehicle, wherein the required power corresponds to a power that is necessary for moving the vehicle at least one of a required speed and a required acceleration along a predefined road course, and assigning to the required power a value of a permissible pedal position, transmitting the value of the permissible pedal position to a pedal control unit, and controlling in the test run the position of the pedal of the vehicle by using the pedal control unit for moving the pedal according to an assignment of the value of the permissible pedal position to the driver model;

wherein the driver model specifies in the test run a plurality of actuating values for controlling the position of the pedal; and wherein the one or more controllers uses the driver model to determine an acceleration power to be provided by the vehicle based on a difference in speed between a speed required for at least one future time and a speed required for a current time specified according to a test protocol;

wherein the acceleration power is required in order to equalise the difference in speed in the test run, and is determined on the basis of the determined difference in speed, and wherein the determined required acceleration power is transmitted to the driver model as required acceleration power.

10. The control device according to claim 9, wherein the one or more controllers are configured to determine an actuating value for adjusting the pedal and to limit the actuating value dynamically through an upper limit value, and to determine the upper limit value on the basis of the value of the permissible pedal position.

11. The control device according to claim 9, wherein the one or more controllers are configured to determine an acceleration power to be provided by the vehicle in that a difference in speed between a speed required for at least one future time and a speed required for a current time is determined and the acceleration power required in order to equalise the difference in speed is determined on the basis of the determined difference in speed, wherein the wherein the one or more controllers are configured to transmit the determined required acceleration power to the driver model as required acceleration power.

12. A method to carry out a test run for a vehicle using a control device according to claim 9.

13. A non-transitory computer program medium having a program code, wherein the program code when executed on a computer causes the computer to execute the method according to claim 1.

* * * * *